(12) United States Patent
Solek et al.

(10) Patent No.: US 8,114,024 B2
(45) Date of Patent: Feb. 14, 2012

(54) SEAL FOR A ROTATING SHAFT

(75) Inventors: Roman Solek, Pleasanton, CA (US); Donald Coulthart, Pleasanton, CA (US)

(73) Assignee: Interson Corporation

( * ) Notice: Subject to any disclaimer, the term of this patent is extended or adjusted under 35 U.S.C. 154(b) by 676 days.

(21) Appl. No.: 12/186,793

(22) Filed: Aug. 6, 2008

(65) Prior Publication Data

US 2009/0051121 A1 Feb. 26, 2009

Related U.S. Application Data

(60) Provisional application No. 60/956,748, filed on Aug. 20, 2007.

(51) Int. Cl.
*A61B 8/14* (2006.01)
(52) U.S. Cl. ........ 600/459; 277/402; 277/500; 277/585; 277/607
(58) Field of Classification Search .................. 600/437, 600/444, 445, 446, 462, 459; 277/311, 320, 277/402, 500, 585, 607; 73/584, 632
See application file for complete search history.

(56) References Cited

U.S. PATENT DOCUMENTS

| | | |
|---|---|---|
| 3,475,033 A | 10/1969 | Voitik |
| 3,508,758 A | 4/1970 | Strub et al. |
| 3,591,188 A | 7/1971 | Eisner |
| 3,620,584 A | 11/1971 | Rosensweig |
| 3,972,536 A | 8/1976 | Warner et al. |
| 4,010,960 A | 3/1977 | Martin |
| 4,061,345 A | 12/1977 | Lund |
| 4,116,451 A | 9/1978 | Nixon et al. |
| 4,212,475 A | 7/1980 | Sedy |
| 4,613,141 A | 9/1986 | Heinen |
| 4,655,462 A | 4/1987 | Balsells |
| 4,678,210 A | 7/1987 | Balsells |
| 4,694,213 A | 9/1987 | Gowda et al. |
| 4,804,290 A | 2/1989 | Balsells |
| 4,805,943 A | 2/1989 | Balsells |
| 4,826,144 A | 5/1989 | Balsells |
| 4,830,344 A | 5/1989 | Balsells |
| 4,876,781 A | 10/1989 | Balsells |
| 4,890,937 A | 1/1990 | Balsells |
| 4,893,795 A | 1/1990 | Balsells |
| 4,907,788 A | 3/1990 | Balsells |
| 4,915,366 A | 4/1990 | Balsells |
| 4,934,666 A | 6/1990 | Balsells |
| 4,961,253 A | 10/1990 | Balsells |
| 4,964,204 A | 10/1990 | Balsells |
| 4,974,821 A | 12/1990 | Balsells |
| 5,039,115 A | 8/1991 | Hebert et al. |
| 5,072,070 A | 12/1991 | Balsells |
| 5,072,949 A | 12/1991 | Lopperi |
| 5,108,078 A | 4/1992 | Balsells |

(Continued)

*Primary Examiner* — Brian Casler
*Assistant Examiner* — Christopher Cook
(74) *Attorney, Agent, or Firm* — Fliesler Meyer LLP

(57) ABSTRACT

An encapsulated rotary seal around a rotating shaft, the seal having an outer annular body and an inner annular body. The inner annular body engages the rotating shaft and permits free rotation of the shaft while providing a liquid tight seal around the rotating shaft. The outer annular body is molded about and permanently adhered to the inner annular body, the outer annular body permitting limited non-concentric or eccentric movement of the rotating shaft engaged to the inner annular body without affecting the integrity of the seal between the rotating shaft and the inner annular body.

11 Claims, 3 Drawing Sheets

U.S. PATENT DOCUMENTS

| | | |
|---|---|---|
| 5,117,066 A | 5/1992 | Balsells |
| 5,134,244 A | 7/1992 | Balsells |
| 5,139,234 A | 8/1992 | Cochrane |
| 5,139,276 A | 8/1992 | Balsells |
| 5,160,122 A | 11/1992 | Balsells |
| 5,161,806 A | 11/1992 | Balsells |
| 5,375,291 A | 12/1994 | Tateyama et al. |
| 5,538,258 A | 7/1996 | Hager et al. |
| 5,636,848 A | 6/1997 | Hager et al. |
| 5,860,656 A | 1/1999 | Obata et al. |
| 5,913,447 A * | 6/1999 | Carpenter ............... 220/664 |
| 2004/0195778 A1* | 10/2004 | Smith et al. ............. 277/549 |
| 2006/0145426 A1* | 7/2006 | Schroeder et al. ........ 277/559 |
| 2007/0220977 A1* | 9/2007 | Hart et al. .............. 73/632 |
| 2008/0047306 A1* | 2/2008 | Dahlheimer ............. 68/5 E |

* cited by examiner

SEAL FOR A ROTATING SHAFT

The present application claims the benefit of priority under 35 U.S.C. §119(e) to U.S. Provisional Patent Application entitled "Seal for a Rotating Shaft," Application No. 60/956,748, filed on Aug. 20, 2007, which application is incorporated herein by reference.

FIELD OF THE INVENTION

The present invention relates to a seal for a rotating shaft, more specifically a seal around a rotating shaft within an ultrasound transducer.

BACKGROUND

Ultrasound systems employing ultrasonic transducers are widely used in medical applications to visualize muscles and internal organs, as well as during pregnancies to view the fetus in the womb. While many different types of transducers are used, a typical transducer includes a transducer element which sends out high-frequency sound waves to be reflected off body structures. The transducer element is often attached to a motor which allows the transducer element to rotate, swing and/or vibrate within the transducer. The motor is encased within the housing of the transducer while the transducer element is located within a membrane outside of the housing, the motor and the transducer element being connected by a rotating shaft. An ultrasound coupling fluid is placed inside the membrane in contact with the transducer.

During an ultrasound examination, a liquid gel or coupling fluid is often applied on the patient over the area to be scanned. The coupling fluid is placed within the transducer membrane surrounding the transducer element. After the gel is applied, the membrane of the transducer is placed on and moved over the area being examined by a sonographer. Meanwhile, the transducer element is being mechanically rotated within the membrane of the transducer throughout the examination.

While the fluid may be necessary to ultrasound transmission, the motor can become damaged if it comes into contact with the fluid. Accordingly, the transducer housing is often designed to separate the fluid in the membrane from the motor. Nevertheless, the fluid often leaks into the housing and contacts the motor through the opening in the housing for the rotating shaft. Accordingly, what is needed is a seal that fits around the rotating shaft that prevents the fluid from reaching the motor. The seal must be small enough to fit inside the transducer, it must allow for rotation of the shaft, and it must be flexible enough to account for the natural vibrations of the rotating shaft during use, all the while preserving the integrity of the seal.

With respect to the prior art, mechanical arrangements for incorporating seals around a rotating shafts are commonly used, and such seals are used in medical devices, such as ultrasound transducers. For example, U.S. Pat. No. 4,655,462 discloses a coil spring seal which can be used around a rotating shaft to prevent leakage.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention. In the drawings.

DETAILED DESCRIPTION

The present invention relates to a seal for a rotating shaft. The seal for a rotating shaft exemplified herein can be preferably used as a rotary seal for use in an ultrasound transducer; however, this seal can be adapted in accordance with the teachings herein for use in other devices.

Figure 1:
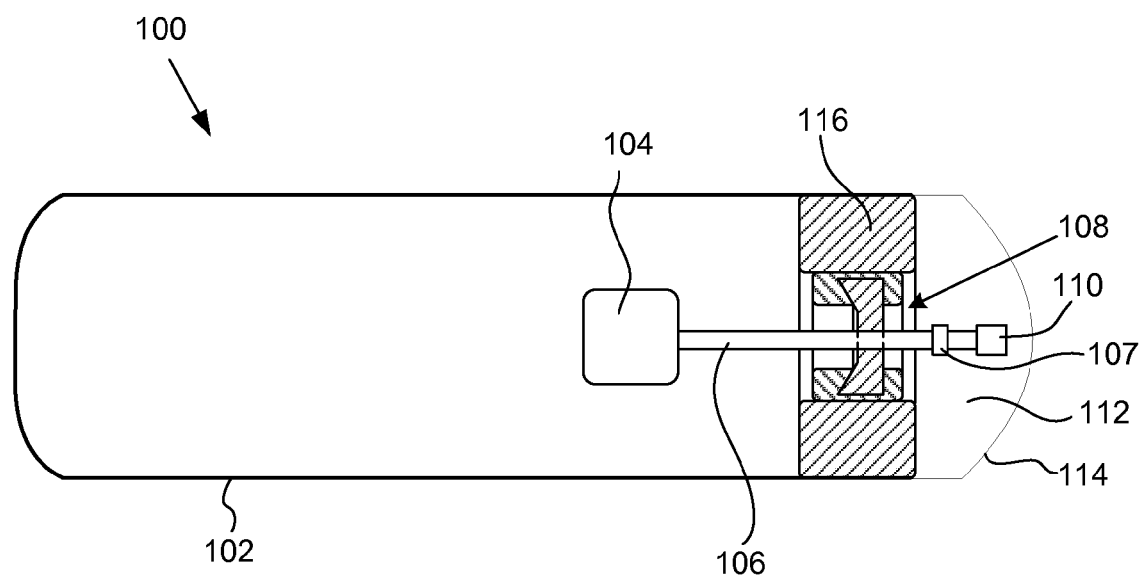
FIG. 1 illustrates an embodiment of the invention within an ultrasound transducer.

FIG. 1 illustrates an exemplary ultrasound transducer using an embodiment of the seal for a rotating shaft. The ultrasound transducer, generally numbered 100, includes a housing 102, a motor 104, a rotating shaft 106, a seal for the rotating shaft, generally numbered 108, a transducer element 110, a fluid chamber 112, a membrane 114, and a housing fluid barrier 116. The rotating shaft 106 is attached to the motor 104 on one end, extends through the seal 108, and is attached to the transducer element 110 on the other end. The rotating shaft 106 can also include or go through a mechanical motion transformer 107 to allow the rotating shaft 106 to rotate about the longitudinal axis central to the rotating shaft 106 while the transducer element 110 is rotated within the gel chamber 112 in an oscillating or fluctuating manner. The seal for the rotating shaft 108 is centrally engaged to the housing fluid barrier 116.

Figure 2:
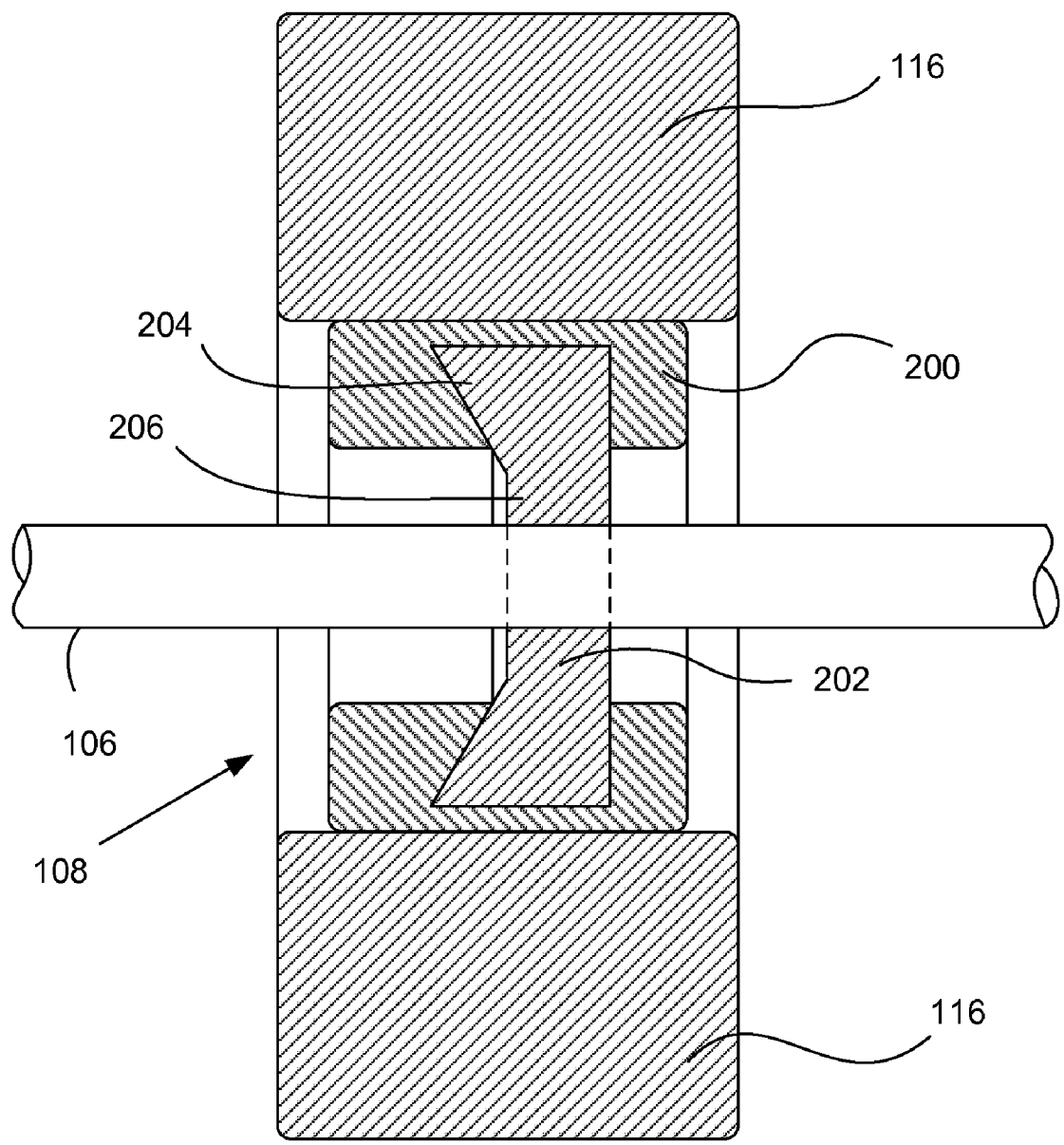
FIG. 2 illustrates a cross-sectional view of an embodiment of the invention.
Figure 3A:
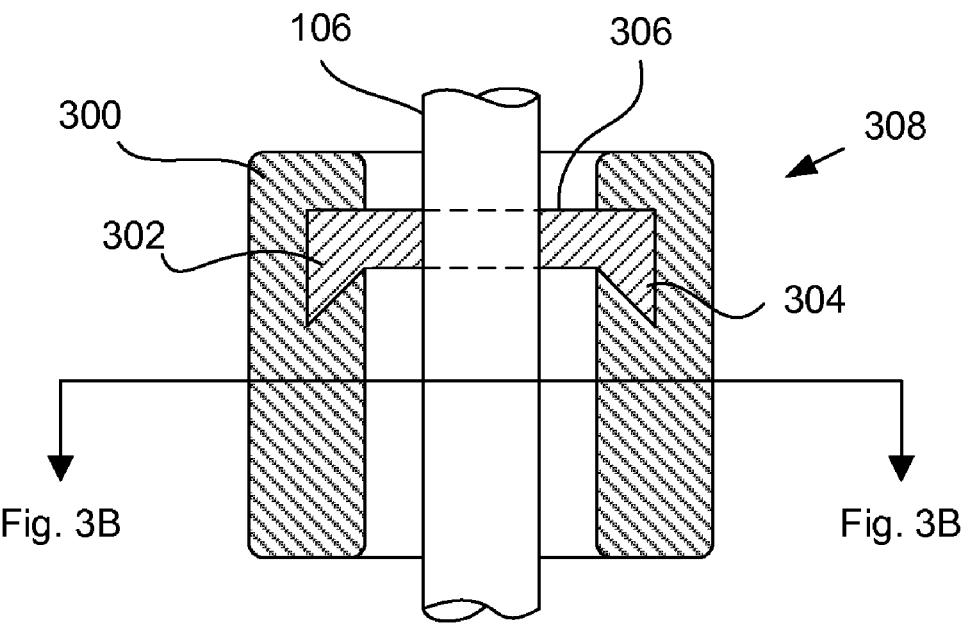
FIGS. 3A, 3B illustrate a side and corresponding top cross-sectional view of an embodiment of this invention.
Figure 3B:
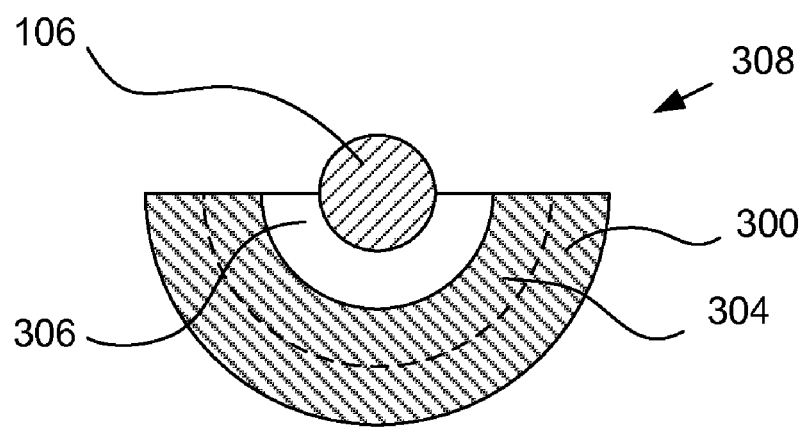

FIG. 2 corresponds to the embodiment of the seal 108 for the rotating shaft 106 illustrated in FIG. 1. FIG. 2 illustrates the seal 108 for the rotating shaft 106, which is embedded within the housing fluid barrier 116. The rotating shaft 106 is engaged by and extends through the seal 108. The seal 108 includes an outer annular body 200 and an inner annular body 202. The outer annular body 200 is molded about the inner annular body 202 and preferably adhered to the inner annular body 202 to form a complete, liquid tight, cohesive assembly. Thus, as shown in FIGS. 3A and 3B (which show a seal 308 having a slightly different geometry), the outer portion 304 of the inner seal 302 is encapsulated within the outer annular body 300 and the inner portion 306 of the inner seal 302 engages the rotating shaft 106 to prevent leakage around the shaft 106 during operation.

In an embodiment, the outer annular body 200 is made of a material which is both rigid enough to allow the seal 108 to be inserted into an aperture within the housing fluid barrier 116 without the requirement of additional restraining devices, yet pliable enough to allow for the rotating shaft 106 engaged to the inner annular body 202 to have a limited amount of non-concentric and/or eccentric movement during operation without affecting the integrity of the seal. In an embodiment, the outer annular body 200 is made of silicone. It is envisioned that the outer annular body 200 may be made of any material consistent with the disclosure set forth above without deviating from the scope of this invention.

In an embodiment, the inner annular body 202 is made of a material that allows free rotation of the rotating shaft 106 while simultaneously providing a liquid tight seal around the rotating shaft 106. In another embodiment, the inner annular body 202 is made of Teflon or graphite or another material or composite that is self-lubricating or has a high level of lubricity. It is, however, envisioned that the inner annular body 202 may be made of any material consistent with the disclosure set forth above without deviating from the scope of this invention. Preferably the inner annular body is of solid, one-piece construction. In an embodiment, the inner annular body 202 comprises a tapered lip 206 to assist in holding the inner annular body 202 in the outer annular body 200. In yet another embodiment, the inner annular body 202 includes a wider outer edge, as compared to the inner edge of the inner annular body 202, to provide a stronger base within the outer annular body 200.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A seal connectable with a housing fluid barrier to prevent leakage about a rotating shaft, the seal comprising:
   an inner annular body adapted to engage the rotating shaft, the inner annular body permitting rotation of the rotating shaft about an axis while providing a seal around the rotating shaft, the inner annular body having a tapered lip along an outer edge of the inner annular body that increases a width of the inner annular body along the axis; and
   an outer annular body encapsulating at least a portion of the tapered lip of the inner annular body and connecting the inner annular body with the housing fluid barrier, the outer annular body being pliable to permit limited eccentric movement of the rotating shaft engaged to the inner annular body while maintaining the integrity of the seal between the rotating shaft and the inner annular body;
   wherein the outer annular body comprises silicone; and
   wherein the permitted limited eccentric movement is determined by the outer annular body.

2. The seal of claim 1 wherein the seal is secured to a cavity along a periphery of the outer annular body.

3. The seal of claim 1 wherein the inner annular body comprises a composite material including graphite or Teflon.

4. The seal of claim 1 wherein said inner annular body is of one-piece construction.

5. A seal connectable with a housing fluid barrier that prevents leakage about a rotating shaft, the seal comprising:
   an inner annular body adapted to engage the rotating shaft, the inner annular body permitting rotation of the rotating shaft about an axis while providing a seal about the rotating shaft, the inner annular body having a tapered lip along an outer edge of the inner annular body that increases a width of the inner annular body along the axis;
   said inner annular body comprises one of Teflon and graphite;
   an outer annular body encapsulating at least a portion of the tapered lip of said inner annular body and connecting the inner annular body with the housing fluid barrier, the outer annular body being pliable to permit limited eccentric movement of the rotating shaft engaged in the inner annular body while maintaining the integrity of the seal between the rotating shaft and the inner annular body; and
   wherein said outer annular body comprises silicone;
   wherein the permitted limited eccentric movement is determined by the outer annular body.

6. The seal of claim 5 wherein said inner annular body is at least partially molded in the outer annular body.

7. An ultrasound probe comprising:
   a motor with a drive shaft;
   an ultrasound transducer element located at a distal end of the drive shaft;
   a housing surrounding the motor;
   a housing fluid barrier connected with the housing;
   a seal connectable with the housing fluid barrier with the drive shaft extending through said seal and outside of said housing, with the distal end of the drive shaft and the ultrasound transducer element located outside of said housing; and wherein said seal includes:
   an inner annular body that engages the drive shaft, the inner annular body permitting rotation of the drive shaft about an axis while providing said seal around the drive shaft, the inner annular body having a tapered lip along an outer edge of the inner annular body that increases a width of the inner annular body along the axis; and
   an outer annular body encapsulating at least a portion of the tapered lip of the inner annular body and connecting the inner annular body with the housing fluid barrier, the outer annular body being comprised of silicone so as to be pliable to permit limited eccentric movement of the drive shaft, when in rotation, while maintaining the integrity of the seal between the drive shaft and the inner body; and
   wherein the permitted limited eccentric movement is determined by the outer annular body.

8. The seal of claim 7 wherein said inner annular body is only partially molded in the outer annular body.

9. The seal of claim 7 wherein the inner annular body has a wider portion that is captured in the outer annular body and a narrower portion that is located outside of the outer annular body.

10. The seal of claim 7 wherein said inner annular body comprises one of Teflon, graphite, and a composite of graphite and or Teflon.

11. The seal of claim 7 wherein said inner annular body is of one-piece construction.

* * * * *